United States Patent [19]
Okanishi et al.

[11] Patent Number: 5,697,359
[45] Date of Patent: Dec. 16, 1997

[54] ABRASIVE BLADE WITH REDUCED CUTTING NOISE

[75] Inventors: Yukio Okanishi; Kosuke Mitsui; Akihiro Koike; Nobuo Urakawa; Tsutomu Takubo, all of Osaka, Japan

[73] Assignee: Osaka Diamond Industrial Co., Sakai, Japan

[21] Appl. No.: 527,877

[22] Filed: Sep. 14, 1995

[30] Foreign Application Priority Data

Sep. 16, 1994 [JP] Japan .................................. 6-248688
Sep. 16, 1994 [JP] Japan .................................. 6-248689

[51] Int. Cl.$^6$ ..................................................... B28D 1/12
[52] U.S. Cl. ..................... 125/15; 451/542; 451/449; 51/297
[58] Field of Search ........................... 125/15, 13.01; 451/544, 543, 542, 449; 51/297

[56] References Cited

U.S. PATENT DOCUMENTS

| | | | |
|---|---|---|---|
| 3,023,551 | 3/1962 | Osenberg | 125/15 |
| 3,196,584 | 7/1965 | Tatko | 451/541 |
| 3,742,655 | 7/1973 | Oliver | 451/449 |
| 4,867,025 | 9/1989 | Ekloff et al. | 125/15 |
| 5,040,341 | 8/1991 | Okinaga | 451/541 |

FOREIGN PATENT DOCUMENTS

| | | |
|---|---|---|
| A- 0393989 A1 | 10/1990 | European Pat. Off. . |
| A- 844369 | 11/1976 | France . |
| A- 0221875 A1 | 5/1987 | France . |
| A- 3635308 A1 | 6/1988 | Germany . |
| A- 3640772 A1 | 6/1988 | Germany . |
| 4243480 | 6/1994 | Germany ......... 125/15 |
| 52-44075 | 11/1977 | Japan . |
| 55-500536 | 8/1980 | Japan . |
| 59-128358 | 8/1984 | Japan . |
| 63-13650 | 1/1988 | Japan . |
| 0135479 | 5/1989 | Japan ......... 125/15 |
| 2-7015 | 2/1990 | Japan . |
| 4-115874 | 4/1992 | Japan . |
| 4-365561 | 12/1992 | Japan . |
| 7-132465 | 5/1995 | Japan . |

*Primary Examiner*—Robert A. Rose
*Attorney, Agent, or Firm*—W. G. Fasse; W. F. Fasse

[57] ABSTRACT

A blade comprises a disc-shaped substrate having a major surface and an outer peripheral edge portion encircling the major surface, and an abrasive grain layer mounted on the outer peripheral edge portion of the substrate. The substrate includes a first disc having a major surface, and a second disc having a major surface which is superposed on that of the first disc. The major surface of the second disc is separated from that of the first disc, thereby defining a clearance between the major surfaces of the first and second discs and correspondingly forming a convex surface region on the outside surface of the substrate. The peripheral portion of the convex surface region is provided with a contact portion where the major surfaces of the first and second discs are slidably in contact with each other. An adhesion inhibitor is applied to the major surfaces of the first and second discs before superposing these major surfaces with each other, and the outer peripheral edge portions of the superposed first and second discs are covered with a mixed powder of abrasive grains and metal powder. The mixed powder is then sintered, thereby forming the abrasive grain layer which is fixed to the outer peripheral edge portions. The first and second discs are then spot-welded together at a plurality of locations between the major surfaces of the first and second discs.

16 Claims, 8 Drawing Sheets

ABRASIVE BLADE WITH REDUCED
CUTTING NOISE

BACKGROUND OF THE INVENTION

1. Field of the Invention

The present invention relates to a blade and a method of manufacturing the same, and more specifically, it relates to a blade comprising a super abrasive grain layer of diamond or CBN (cubic boron nitride) which is employed for grinding or cutting various members such as stone and concrete members, and a method of manufacturing the same.

2. Description of the Background Art

A well-known blade of this type is formed by fixing a super abrasive grain layer to the outer peripheral edge portion of a disc which is made of steel.

Various improvements have been made in such a blade, in order to improve grindability, working surfaces, and the life of the blade. In order to suppress a noise which is caused in a cutting operation with such a blade, Japanese Utility Model Publication No. 2-7015 (1990), for example, proposes a blade which damps vibration in cutting thereby reducing the noise.

The blade disclosed in the cited Japanese Utility Model comprises a metal base which is prepared by superposing a plurality of steel plates, each having a number of notched grooves provided at prescribed spaces on its peripheral edge, with each other and connecting these steel plates with each other by spot welding while defining small clearances therebetween, and mounting tips on segments between the notched grooves provided along the peripheral edge of the metal base. Air flows and air movements in the small clearances cause viscous resistance, to damp vibration of the steel plates forming the blade. Thus, the blade can be prevented from causing a noise during its cutting operation.

In the blade disclosed in the aforementioned Japanese Utility Model however, it is difficult to adjust the positions and sizes of the small clearances which are defined between the steel plates, although the noise is reduced as compared with a blade employing a metal base consisting of a single steel plate. Thus, different samples of such a blade are disadvantageously dispersed or varied in damping performance. Further, it is difficult to manufacture a blade having constant damping performance, due to requirement for adjustment of the positions and sizes of the clearances.

SUMMARY OF THE INVENTION

An object of the present invention is to stably and readily manufacture a blade having a high noise control effect.

Another object of the present invention is to provide a blade which is improved in damping effect as compared with a conventional blade having clearances which are formed in its metal base by spot welding.

Still another object of the present invention is to provide a structure of a blade which can improve a damping effect as well as durability and grindability.

A further object of the present invention is to provide a blade which is improved in damping effect and has high flexural rigidity.

A further object of the present invention is to readily manufacture a blade which can attain a desired damping effect.

A blade according to an aspect of the present invention comprises a discoidal or disc-shaped substrate having a major surface and an outer peripheral edge portion enclosing or encircling the major surface, and an abrasive grain layer which is mounted on the outer peripheral edge portion of the substrate. The substrate includes a first type disc having a major surface, and a second type disc having a major surface which is superposed on that of the first type disc. The first and second type discs are spot-connected with each other on a plurality of portions or locations of the major surfaces. The major surface of at least one of the first and second type discs is separated from that of the other disc, thereby forming a convex surface region on the major surface of the substrate. In the convex surface region, a clearance is defined between the major surfaces of the first and second type discs. A contact portion where the major surfaces of the first and second type discs are slidably in contact with each other is formed along the peripheral portion of the convex surface region.

The inventive blade having the aforementioned structure is provided with the contact portion where the major surfaces of the first and second type discs forming the substrate are slidably in contact with each other. This contact portion is slidable during use of the blade, i.e., in rotation of the blade, due to vibration thereof. Vibrational energy is converted to thermal energy by friction which is caused by such sliding. Thus, the vibration is quickly damped. Consequently, a noise caused by the vibration is prevented. The inventors have recognized that such a working effect is a Coulomb (friction) damping effect. On the basis of this recognition of the working effect, the inventors have been able to attain a desired Coulomb damping effect by forming a convex surface region along with a contact portion in any of a plurality of discs. In order to attain such a damping effect, the shape of the convex surface region and the number of the superposed discs are not restricted. Prescribed portions of at least a plurality of discs are spot-connected with each other so that at least one of the discs, preferably each of two discs corresponding to outer sides when the substrate is formed by three discs, has such a convex surface region outwardly projecting or bulging from its major surface. A clearance is defined between the major surfaces of the discs in the convex surface region, so that a contact portion is formed on the peripheral portion of the convex surface region.

In the blade according to the present invention, the first and second type discs are preferably provided with through holes reaching the clearance. Due to the through holes, an area of the substrate emitting a sound is reduced while it is possible to prevent a resonance phenomenon caused by the presence of the clearance.

In the blade according to the present invention, the outer peripheral edge portion of the substrate is preferably provided with a plurality of notched grooves at prescribed spaces along the circumferential direction. The abrasive grain layer is mounted on parts of the outer peripheral edge portion located between the notched grooves.

In this case, each notched groove preferably extends in a direction which is inclined with respect to the radial direction of the substrate. It is possible to reduce a noise which is caused by rotational vibration of the blade itself by setting the directions of the notched grooves in the aforementioned manner.

More preferably, the convex surface region has an annular shape, to enclose the center of the discoidal substrate. Due to the annular shape of the convex surface region, surface contact accuracy in employment of the blade can be improved. Thus, it is possible to improve the life of the blade as well as the working accuracy for a workpiece which is cut by the blade. Further, it is possible to reduce dispersion or variability between products in the damping performance of the blade.

Further preferably, the convex surface region includes a circular inner peripheral edge, and an outer peripheral edge having projections which are arranged at spaces along the circumferential direction to radially extend from the center of the discoidal substrate. Namely, the convex surface region preferably includes a stellate shape. The blade comprising the convex surface region having such a shape has the aforementioned improved surface contact accuracy, damping performance with small dispersion between products, and high flexural rigidity.

The convex surface region preferably includes concentric inner and outer peripheral edges. In this case, the convex surface region may include first and second type annular surface regions having different diameters, so that the contact portion is formed between the first and second type annular surface regions.

Alternatively, the convex surface region may include a circular inner peripheral edge, and an outer peripheral edge having a plurality of projections which are arranged spaced apart from one another along the circumferential direction and extending in a direction opposite to that of rotation of the substrate. In other words, the convex surface region may have a so-called windmill shape.

According to another preferred aspect of the present invention, a blade comprises a discoidal substrate having a major surface and an outer peripheral edge portion enclosing or encircling the major surface, and an abrasive grain layer which is mounted on the outer peripheral edge portion of the substrate, and the substrate includes first, second and third type discs. The second type disc has a major surface which is superposed on that of the first type disc. The third type disc has a major surface which is superposed on that of the second type disc. The first, second and third type discs are connected with each other at a plurality of portions or locations on each of the major surfaces thereof. The major surface of at least one of the first and third type discs forming outer surfaces of the substrate is separated from that of the second type disc, thereby forming a convex surface region on the major surface of the substrate. In the convex surface region, a clearance is defined at least between either the major surfaces of the first and second type discs or those of the second and third type discs. A contact portion where at least either the major surfaces of the first and second type discs or those of the second and third type discs are slidably in contact with each other is formed in the peripheral portion of the convex surface region. The first, second and third type discs are provided with through holes passing through the clearance. The outer peripheral edge portion of the substrate is provided with a plurality of notched grooves at prescribed spaces in the circumferential direction. The abrasive grain layer is mounted on parts of the outer peripheral edge portion located between the notched grooves. Each notched groove extends in a direction which is inclined with respect to the radial direction of the substrate. The convex surface region has an annular shape enclosing the center of the discoidal substrate. The convex surface region includes a circular inner peripheral edge, and an outer peripheral edge having a plurality of projections which are arranged spaced apart from one another in the circumferential direction and radially extending from the center of the discoidal substrate. Namely, the convex surface region has the so-called stellate shape.

A method of manufacturing a blade according to one aspect of the present invention comprises the following steps of:

(a) preparing first and second type discs having major surfaces and outer peripheral edge portions enclosing or encircling the major surfaces;

(b) forming a convex surface region on the major surface of at least one of the first and second type discs;

(c) interposing an adhesion inhibitor between the first and second type discs and superposing the discs with each other;

(d) covering the outer peripheral edge portions of the superposed first and second type discs with a mixture of abrasive grains and metal powder and sintering the mixture, thereby forming an abrasive grain layer which is fixed to the outer peripheral edge portions; and (e) spot-welding a plurality of portions or locations between the major surfaces of the first and second type discs.

In the aforementioned method of manufacturing a blade, an adhesion inhibitor such as carbon, boron, silicon or ceramics is applied to the major surfaces of the first and second type discs which are superposed with each other. Therefore, the major surfaces of the first and second type discs are not integrated or fused with each other by fusion or diffusion except the outer peripheral edge portions, also when the abrasive grain layer is formed on the outer peripheral edge portions of the first and second type discs by sintering. Thus, it is possible to form contact portions which are slidably in contact with each other in the major surface regions of the first and second type discs other than the outer peripheral edge portions. More specifically, it is possible to define a clearance between the major surfaces of the first and second type discs in the convex surface region which is formed on the major surface of at least one of the first and second type discs. Further, the aforementioned contact portions can be formed in the peripheral portion of the convex surface region.

In the aforementioned method, the spot welding step may be carried out either before or after the step of forming the abrasive grain layer.

A method of manufacturing a blade according to another aspect of the present invention comprises the steps of:

(a) preparing first, second and third type discs having major surfaces and outer peripheral edge portions enclosing the major surfaces;

(b) forming a convex surface region on the major surface of at least any one of the first, second and third type discs;

(c) interposing an adhesion inhibitor between the first, second and third type discs and superposing these discs with each other while arranging the first and third type discs on outer sides and the second type disc at the center respectively;

(d) covering the outer peripheral edge portions of the superposed first, second and third type discs with a mixture of abrasive grains and metal powder and sintering the mixture, thereby forming an abrasive grain layer which is fixed to the outer peripheral edge portions; and (e) spot-welding a plurality of portions or locations between the major surfaces of the first, second and third type discs.

In the aforementioned method of manufacturing a blade, each of the first and third type discs positioned on the outer sides has a first diameter, and the second type disc positioned at the center has a second diameter which is larger than the first diameter. Thus, the abrasive grain layer can be readily fixed to the outer peripheral edge portions of the discs by heating and pressurizing the same in the step of forming the abrasive grain layer on the outer peripheral edge portions of the superposed first, second and third type discs by sintering.

In the aforementioned method, the spot welding step may be carried out either before or after the step of forming the abrasive grain layer.

A method of manufacturing a blade according to a further aspect of the present invention comprises the steps of:

(a) preparing first and second type discs having major surfaces and outer peripheral edge portions enclosing or encircling the major surfaces;

(b) forming a convex surface region on the major surface of at least one of the first and second type discs;

(c) superposing the major surfaces of the first and second type discs with each other;

(d) spot-welding a plurality of portions or locations between the major surfaces of the first and second type discs; and (e) fixing a previously sintered abrasive grain layer to the outer peripheral edge portions of the superposed first and second type discs.

A method of manufacturing a blade according to a further aspect of the present invention comprises the steps of:

(a) preparing first, second and third type discs having major surfaces and outer peripheral edge portions enclosing or encircling the major surfaces;

(b) forming a convex surface region on the major surface of at least one of the first, second and third type discs;

(c) superposing the major surfaces of the first, second and third type discs with each other; and (d) spot-welding a plurality of portions or locations between the major surfaces of the first, second and third type discs; and (e) fixing a previously sintered abrasive grain layer to the outer peripheral edge portions of the superposed first, second and third type discs.

In the aforementioned method, the previously sintered abrasive grain layer is fixed to the outer peripheral edge portions of the discs by brazing, resistance welding, laser welding or the like.

According to the present invention, as hereinabove described, it is possible to obtain a blade having a remarkable effect of reducing a noise which is caused during cutting. Further, it is possible to provide a structure of a blade which can improve a damping effect as well as durability and grindability. In addition, it is possible to obtain a blade having an improved damping effect as well as high flexural rigidity. It is possible to obtain a blade having smaller dispersion in damping performance between products. The aforementioned blade can be readily manufactured. It is also possible to expect such an effect that cutting is smoothly performed by the convex surface region which is formed on the major surface of the substrate and the notches inclined with respect to the radial direction of the substrate, to achieve prompt discharge of chips.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
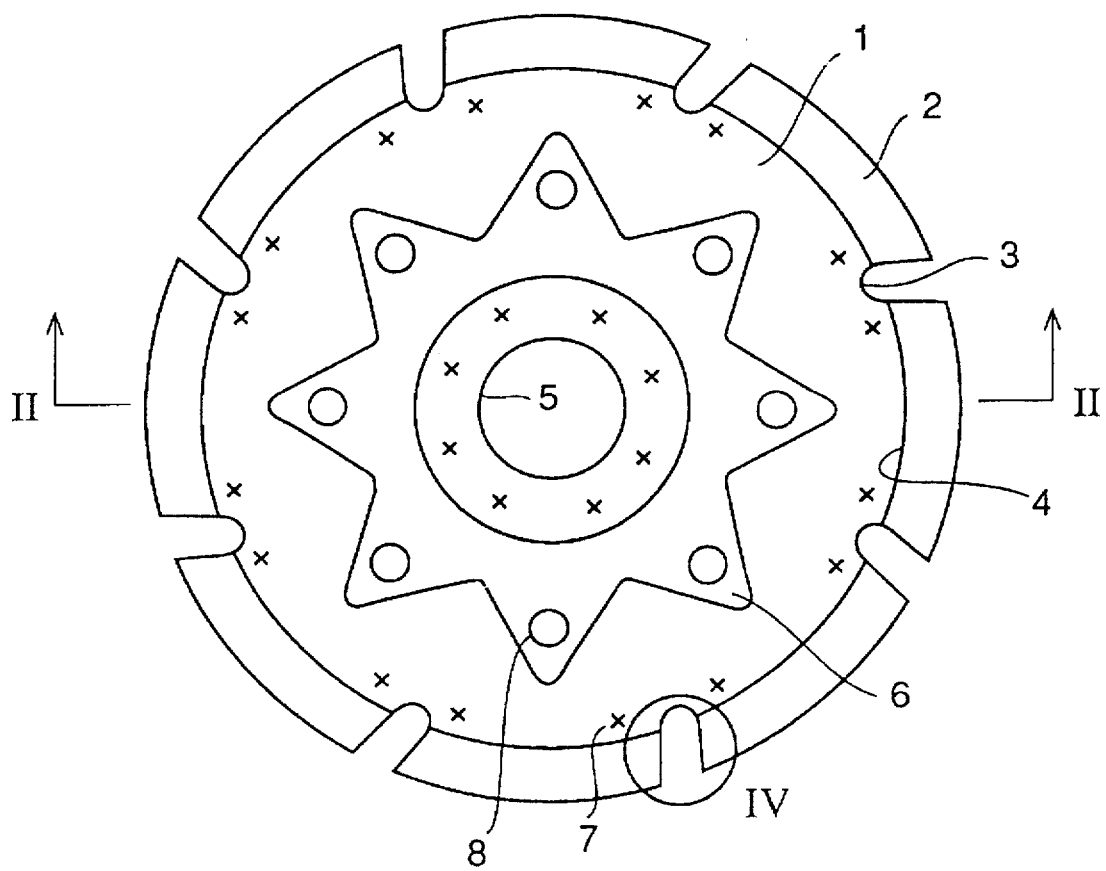
FIG. 1 is a front elevational view showing a blade according to an embodiment of the present invention.
Figure 2:
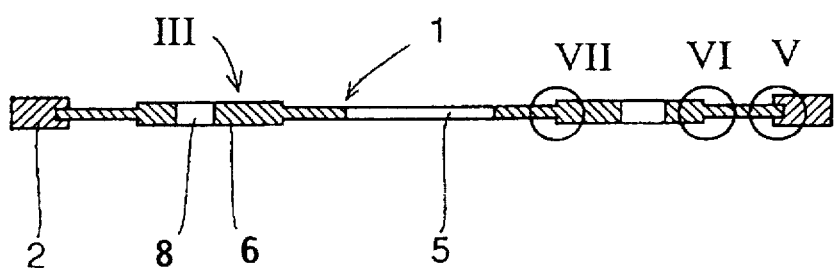
FIG. 2 is a schematic sectional view taken along the line II—II in FIG. 1.
Figure 3:
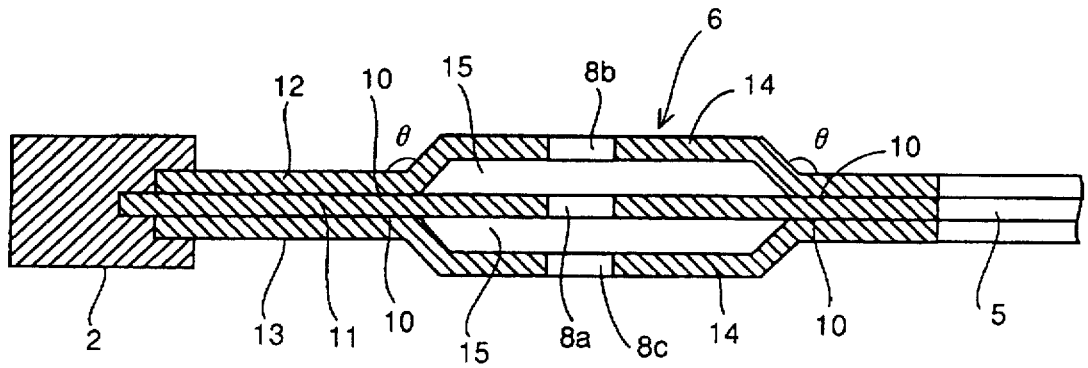
FIG. 3 is an enlarged sectional view illustrating a portion III shown in FIG. 2 in detail.
Figure 4:
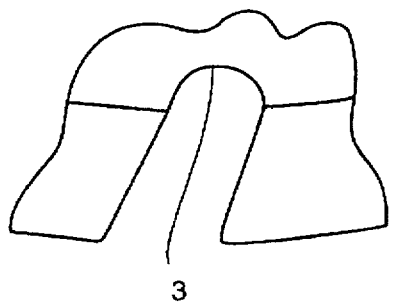
FIG. 4 is an enlarged view illustrating a portion IV shown in FIG. 1.

Referring to FIGS. 1 to 8, super abrasive grain layers 2 are formed on the outer peripheral edge of a metal base 1 which is made of steel. Eight notches 3 are formed in the outer peripheral edge of the metal base 1. Eight segments 4 are formed between these notches 3. The super abrasive grain layers 2 are formed on the respective segments 4. The metal base 1 is provided with a stellate convex region 6 around an axial hole 5. This convex region 6 corresponds to a hatched portion appearing in FIG. 8. Contact or pressure-contact regions 10 are formed in peripheral portions enclosing the convex region 6. The contact regions 10 are illustrated by thick lines enclosing the hatched region in FIG. 8.

The metal base 1 is formed by superposing a disc 11 which is positioned at the center and discs 12 and 13 which are positioned on outer sides thereof with each other. The discs 11, 12 and 13 are spot-welded in portions or locations 7. According to this embodiment, a plurality of spot-welded portions 7 are provided inside the convex region 6 along a concentric circle around the axial hole 5. Further, another plurality of spot-welded portions 7 are provided at base portions of the notches 3. Through holes 8 are formed to axially pass through the convex region 6.

Particularly with reference to FIGS. 3 to 7, the convex region 6 is formed on the metal base 1 by previously providing outwardly deformed convex portions 14 on the discs 12 and 13 which are positioned on the outer sides respectively. In the convex region 6, clearances 15 are defined between the discs 11, 12 and 13. Through holes 8a, 8b and 8c are provided in the discs 11, 12 and 13 respectively to pass through the clearances 15. Due to such formation of the convex region 6, the contact regions 10 are formed along its peripheral portions. The contact regions 10 are formed between the major surfaces of the discs 11 and 12 and those of the discs 11 and 13 respectively. In other words, the discs 12 and 13 are worked to be convexly deformed toward the exterior of the disc surfaces respectively for forming the convex region 6, thereby defining the contact regions 10 between the discs 11, 12 and 13 as pressure contact regions. In the contact regions 10, the discs 11 and 12 as well as the discs 11 and 13 are slidably in contact with each other. Small clearances 9 are defined in portions separated from the contact regions 10. The small clearances 9 are readily defined by drawing for forming the convex portions 14. The contact regions 10 which are formed in the aforementioned manner slide by vibration of the discs 11, 12 and 13 during cutting. Due to friction caused by such sliding, vibrational energy is converted to thermal energy. Consequently, the vibration is quickly damped so that no noise results from the vibration.

The degree of the contact pressure in the contact regions 10 can be increased by working the discs 11, 12 and 13 so that angles 8 (FIG. 3) for forming the convex portions 14 are minimized, i.e., so that inclined portions for forming the convex portions 14 are steep. Thus, it is possible to improve the efficiency for converting the vibrational energy to thermal energy by friction. Consequently, the damping effect can be further improved.

Example 1 of the blade having the aforementioned structure was prepared as follows:

Copper plated steel discs 11, 12 and 13 of 0.5 mm in thickness were prepared. The disc 11 which was positioned at the center and the discs 12 and 13 which were positioned on outer sides thereof were 93.4 mm and 91.4 mm in diameter respectively. The discs 12 and 13 were drawn to be deformed toward the exterior from the disc surfaces, thereby defining convex portions 14. Thus, an eight-pointed stellate convex region 6 was formed. Carbon powder was applied as an adhesion inhibitor to the major surfaces of the discs 11, 12 and 13 which were superposed with each other, except the outer peripheral edge portions.

Eight notches 3 were formed in the outer peripheral portion of each of the discs 11, 12 and 13, so that each notch 3 extended in a direction which was inclined with respect to the radial direction. Each notch 3 was so provided that its bottom portion was positioned in the radial direction of each depression of the stellate convex region 6. The discs 11, 12 and 13 were superposed with each other, segments 4 located between the notches 3 which were provided in the outer peripheral edge portions were covered or charged with a mixture of diamond particles and metal powder of copper, tin, iron, nickel, cobalt or the like, and the mixture was heated to about 700° C. to be sintered, thereby forming super abrasive grain layers 2.

Figure 5:
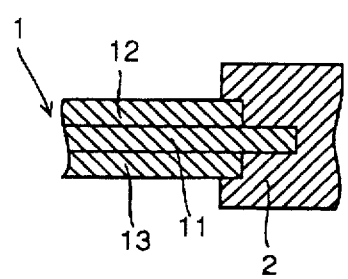
FIG. 5 is an enlarged view illustrating a portion V shown in FIG. 2.
Figure 6:
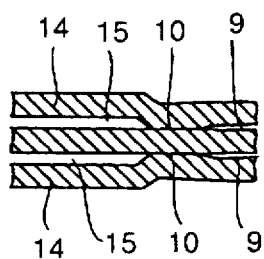
FIG. 6 is an enlarged view illustrating a portion VI shown in FIG. 2.
Figure 7:
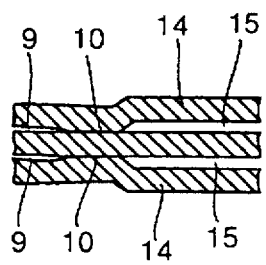
FIG. 7 is an enlarged view illustrating a portion VII shown in FIG. 2.
Figure 8:
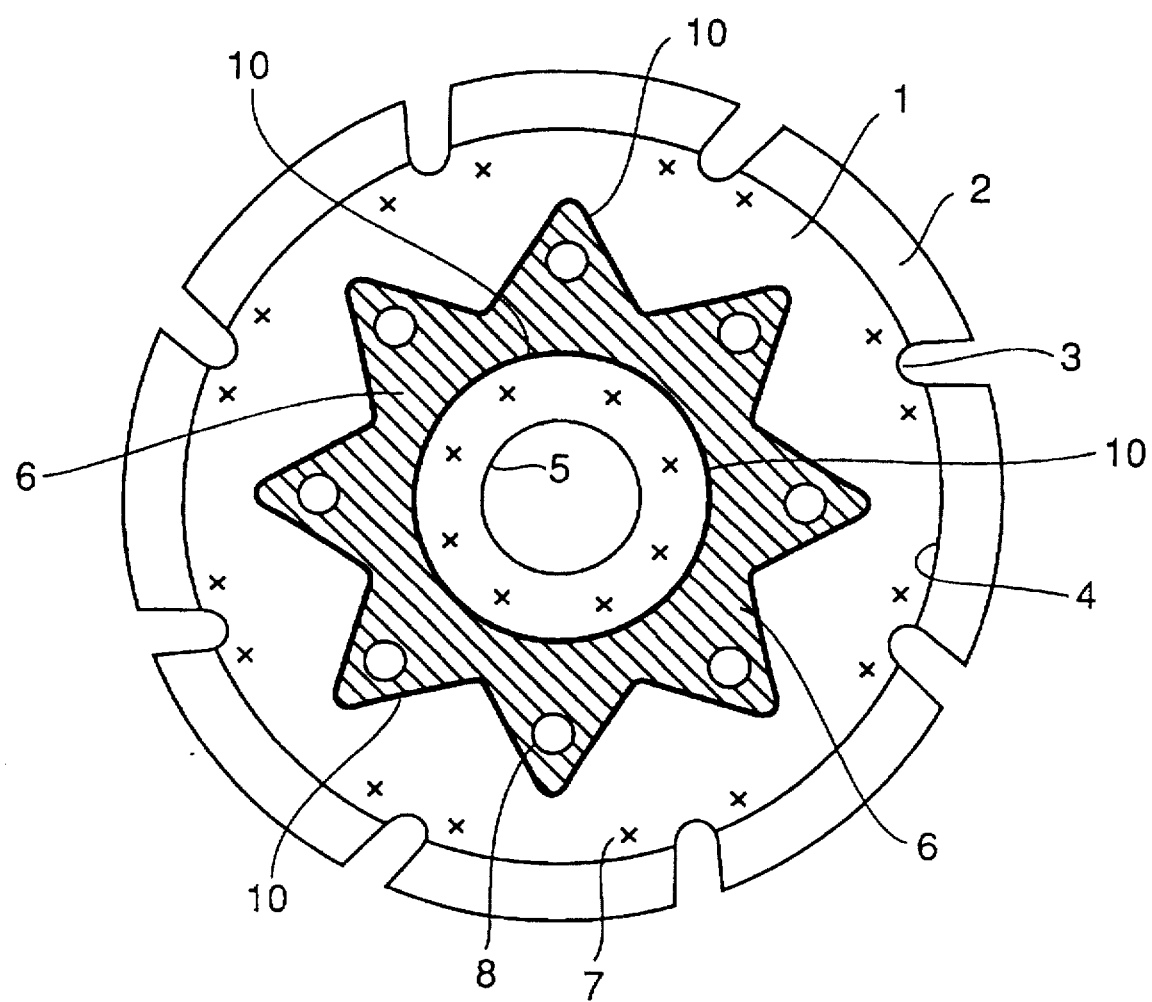
FIG. 8 is a front elevational view clearly illustrating a convex region and a contact region shown in FIG. 1.

Each super abrasive grain layer 2 was fixed to a metal base 1 while covering the outer peripheral edge of the same, as shown in FIG. 5. The central disc 11 forming the metal base 1 had a relatively large diameter while each of the discs 12 and 13 provided on both sides thereof had a smaller diameter, whereby the super abrasive grain layers 2 were readily integrally fixed to the metal base 1 when the superposed outer peripheral edge portions were covered with the mixture and heated and pressurized in a furnace. Due to the application of the adhesion inhibitor, the major surfaces of the discs 11, 12 and 13 were prevented from being fixed to each other directly or through the plating of copper or a copper alloy, while being kept in contact with each other.

After the formation of the super abrasive grain layers 2, the metal base 1 was taken out from the furnace, and a number of portions or locations 7 were spot-welded around an axial hole 5 and in the vicinity of base portions of the notches 3, in order to reinforce the connection between the discs 11, 12 and 13 and increase a desired damping effect. The super abrasive grain layers 2 were 2.0 mm in thickness, and the blade as formed was 105 mm in outer diameter.

Axial through holes 8 of 5 mm in diameter were formed so that the clearances 15 which were defined by the convex region 6 were not closed but rather were open through the holes 8. The clearances 15 were about 0.15 mm in thickness.

Each of the Examples 1 to 3 which were prepared in the aforementioned manner and conventional and comparative examples were employed for cutting a concrete block forming a boundary between a pavement and a roadway by 30 cm. Table 1 shows noises caused in such cutting, which were measured at a position separated by 1 m from the working position.

TABLE 1

| Test Sample | Structure | Noise Value (dB) |
|---|---|---|
| Example 1 | FIG. 1 | 89 |
| Example 2 | spot welding carried out before sintering of super abrasive grains in FIG. 1 | 93 |
| Example 3 | provided with no through holes in FIG. 1 | 92 |
| Conventional Example 1 | with single-layer metal base | 102 |
| Conventional Example 2 | with no convex portion, no adhesion inhibitor and no inclination of notches; super abrasive grain layer formed on metal base by brazing | 92 |
| Comparative Example 1 | no adhesion inhibitor employed in FIG. 1 | 94 |

As clearly understood from Table 1, the blade of Example 1 according to the embodiment shown in FIG. 1 exhibited the lowest noise value. This is conceivably because the contact regions 10 and contact portions which may have been present also around the spot-welded portions 7 slid in vibration while the vibration of the super abrasive grain layers caused during cutting travels to the metal base 1. The vibrational energy was conceivably converted to thermal energy due to such friction, to cause a Coulomb damping effect.

This Coulomb damping effect is regarded as being proportional to the pressing force effective at the contact portions. The spot welding is an effective means for increasing such pressing force. Example 1 was superior to Example 2 conceivably because it was possible to further increase the Coulomb damping effect by carrying out the spot welding after the sintering. The clearances 15 are necessary for forming the contact regions 10, and have an effect on the dispersion of the vibration along with the notches 3. However, the clearances 15 disadvantageously lead to resonance when the same are closed, and hence it is preferable to prevent such resonance by providing the through holes 8. The difference between the noise values of Examples 1 and 3 was caused by presence/absence of the through holes 8. Due to the through holes 8, further, it is also possible to expect an effect of reducing a sound emission area of the metal base 1.

While three discs are superposed with each other in the aforementioned embodiment, the effect of the present invention can be attained when at least two discs are superposed with each other. Further, the metal base can alternatively be formed by discs of different materials. In addition, the positions, shapes or numbers of the notches, the convex region or the spot-welded portions may be changed in various ways.

With reference to FIGS. 9 to 16, a blade according to another embodiment of the present invention is now described. Super abrasive grain layers 22 are formed on the outer peripheral edge portion of a metal base 21. Eight notches 23 are formed in the outer peripheral edge portion of the metal base 21. The super abrasive grain layers 22 are fixed onto segments 24 which are located between the notches 23. A convex region 26 is provided in the form of a windmill around an axial hole 25. This convex region 26 corresponds to a hatched region appearing in FIG. 16. Contact regions 30 are formed along the peripheral portion of the convex region 26. The contact regions 30 are shown by thick lines enclosing the hatched portion in FIG. 16.

The metal base 21 is formed by superposing a disc 31 which is positioned at the center and discs 32 and 33 which are positioned on both sides thereof with each other. The discs 31, 32 and 33 are spot-welded with each other at portions or locations 27. The spot-welded portions 27 are provided along a concentric circle around the axial hole 25 and on base portions or areas of the notches 23. Through holes 28 axially pass through the convex region 26.

Particularly with reference to FIGS. 11 to 15, convex portions 34 are formed by outwardly deforming the discs 32 and 33 which are provided on the outer sides. In the convex region 26, clearances 35 are defined between the discs 31 and 32 as well as between the discs 31 and 33. Through holes 28a, 28b and 28c are provided in the discs 31, 32 and 33 respectively, to pass through the clearances 35. Due to the formation of the convex region 26, the contact portions 30 are formed in the peripheral portion of the convex region 26. In these contact portions 30, the major surfaces of the discs 31 and 32 and those of the discs 31 and 33 are slidably in contact with each other. Further, small clearances 29 are formed in portions separated from the contact portions 30.

Similarly to the embodiment shown in FIGS. 1 to 8, the contact portions 30 slide by vibration which is caused when the blade is employed for cutting. Thus, vibrational energy is converted to frictional heat energy. Therefore, a noise which is based on the vibration of the blade is extremely damped. This effect is caused by a Coulomb damping effect, similarly to the embodiment shown in FIGS. 1 to 8.

Figure 13:
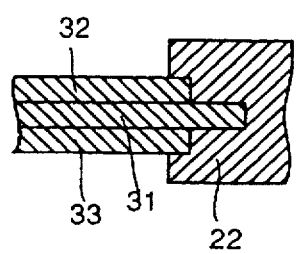
FIG. 13 is an enlarged view illustrating a portion XIII shown in FIG. 10.
Figure 14:
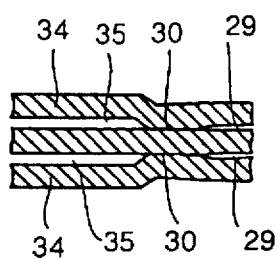
FIG. 14 is an enlarged view illustrating a portion XIV shown in FIG. 10.
Figure 15:
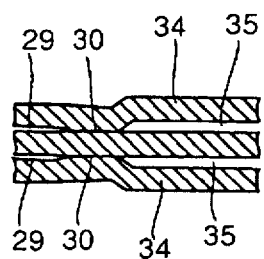
FIG. 15 is an enlarged view illustrating a portion XV shown in FIG. 10.
Figure 16:
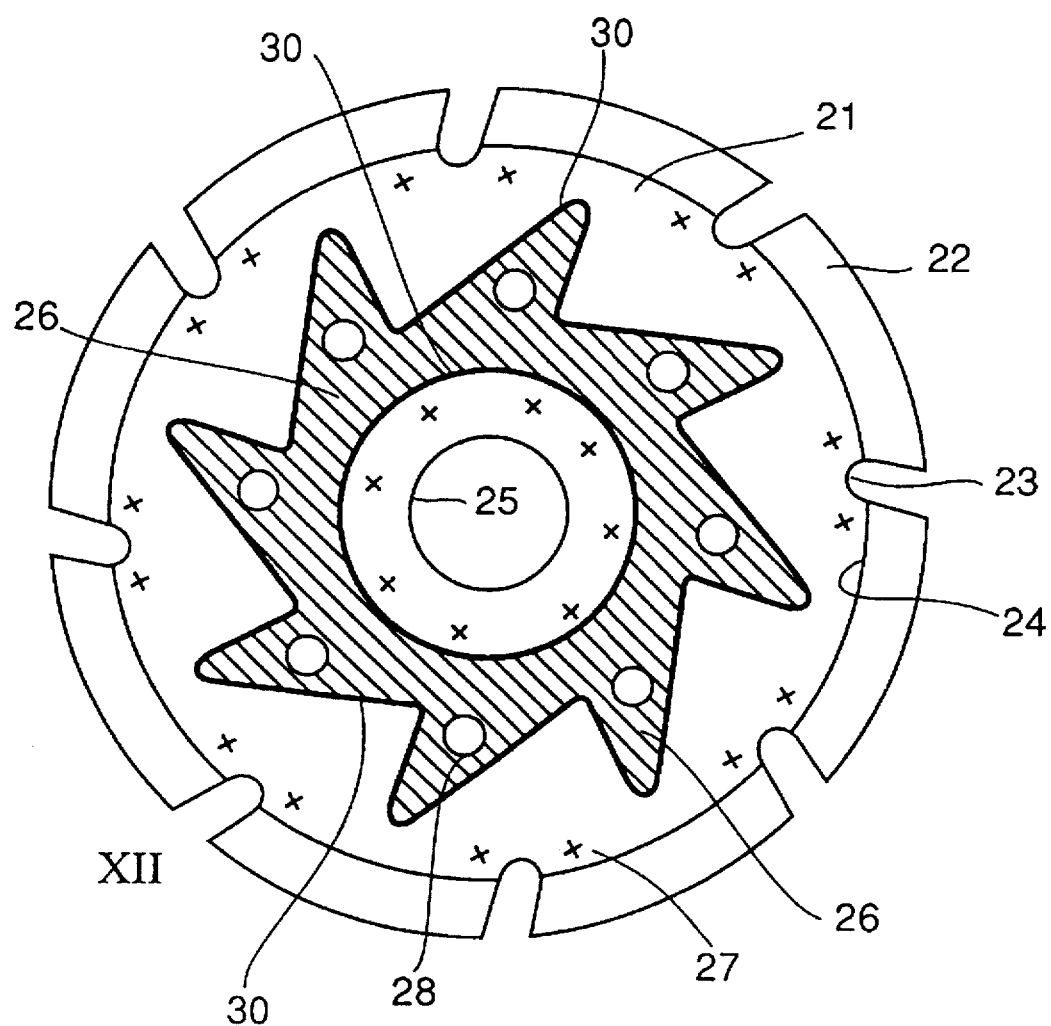
FIG. 16 is a front elevational view clearly illustrating a convex region and a contact region shown in FIG. 9.

A method of manufacturing the blade according to the embodiment shown in FIGS. 9 to 16 is now described. Working of the convex region 26, the notches 23 etc. of the metal base 21 and the spot welding of the discs 31, 32 and 33 are similar to those employed in the method of manufacturing the blade according to the embodiment shown in FIGS. 1 to 8. This method is different from that for the blade according to the embodiment shown in FIGS. 1 to 8 in that the super abrasive grain layers 22 which are previously sintered are fixed to the outer peripheral edges of the segments 24 of the metal base 21 by brazing, resistance welding or laser welding. When the central disc 31 is made larger in diameter than the discs 32 and 33 as shown in FIG. 13, the super abrasive grain layers 22 can be readily fixed and held onto the other peripheral area of the discs. In the case of brazing, it is preferable to prepare the discs 31, 32 and 33 in the same diameters while forming V-shaped grooves in the outer peripheral edges of these discs 31, 32 and 33, thereby increasing the contact areas between the outer peripheral edges of the discs 31, 32 and 33 and the super abrasive grain layers 22.

In an Example of this embodiment, the discs 31, 32 and 33 were prepared from rolled steel plates of 0.5 mm in thickness. Eight segments 24 and eight notches 23 were formed in the outer peripheral portion of each of the discs 31, 32 and 33. Super abrasive grain layers 22 which were fixed to the outer peripheral edge portions of the segments 24 were 2.0 mm in thickness, and the blade as formed was 105 mm in outer diameter.

The discs 32 and 33 were drawn to have convex portions 26 in the form of convex windmills of 0.15 mm in depth and 73 mm in outer peripheral diameter. Further, prescribed portions or locations 27 shown in FIG. 9 were spot-welded, and through holes 28 were formed to pass through the convex region 26. Each of the notches 23 was made to extend in a direction inclined with respect to the radial direction of the metal base 21. Diamond particles forming the super abrasive grain layers 22 were about 0.35 to 0.4 mm in size in 40 to 50 meshes. The diamond had a degree of concentration of 15, and was 0.66 karats/cm$^3$. This means that the super abrasive grain layers 22 contained 3.75% of diamond in volume ratio.

Figure 17:
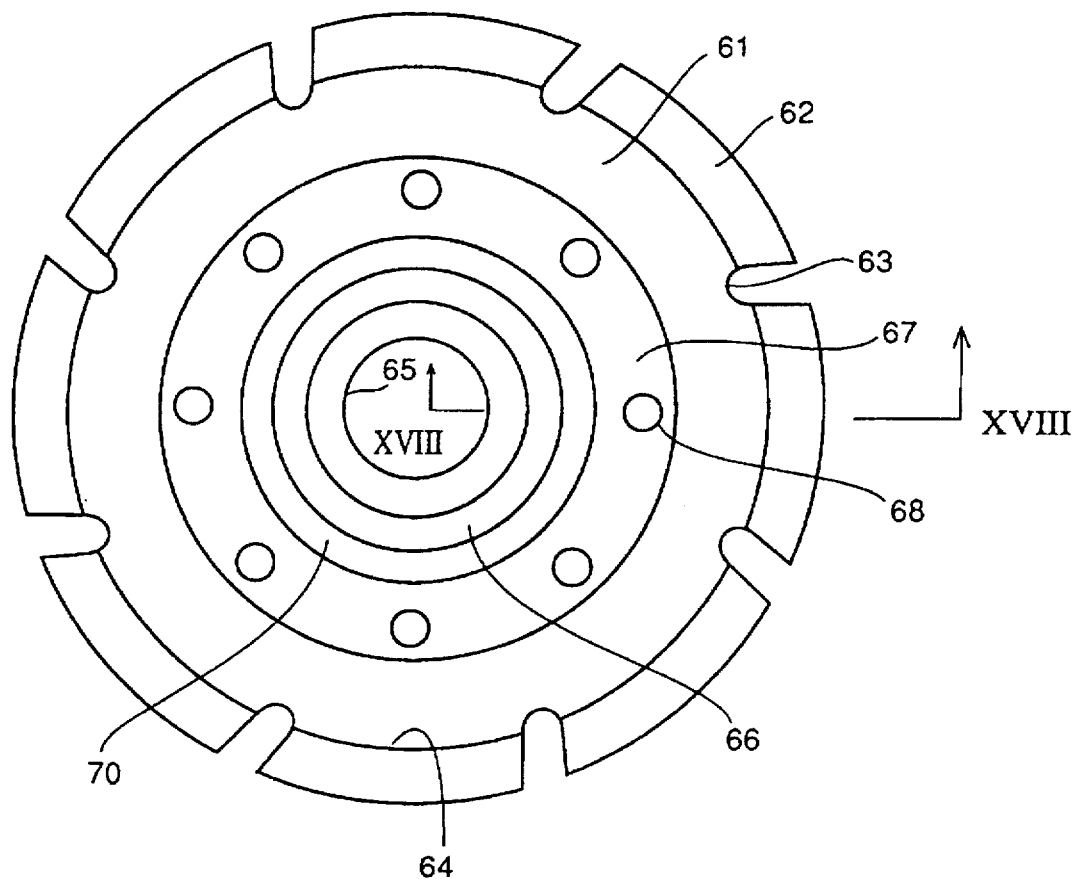
FIG. 17 is a front elevational view showing a blade according to still another embodiment of the present invention.
Figure 18:
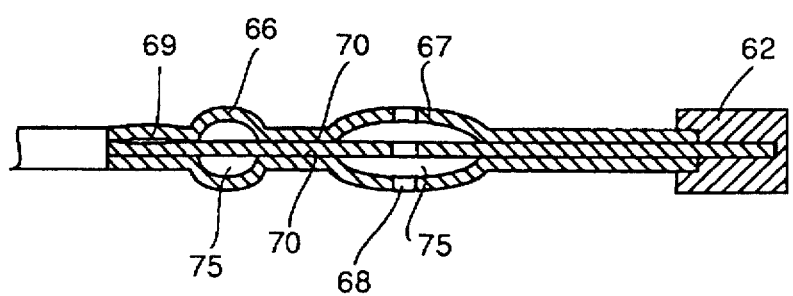
FIG. 18 is a sectional view taken along the line XVIII—XVIII in FIG. 17.
Figure 19:
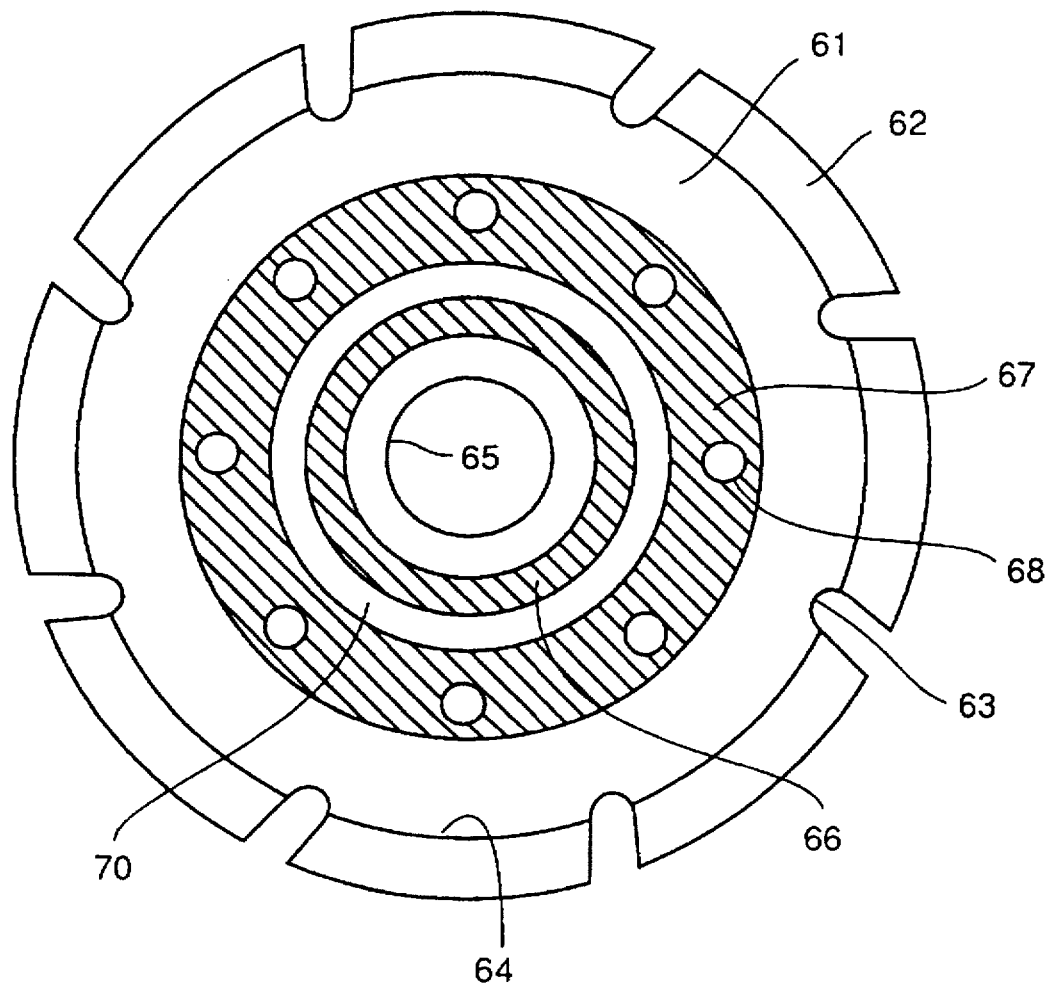
FIG. 19 is a front elevational view clearly illustrating a convex region and a contact region shown in FIG. 17.

With reference to FIGS. 17 to 19, a blade according to still another embodiment of the present invention is now described. Super abrasive grain layers 62 are formed on the outer peripheral edge portion of a metal base 61. Notched grooves 63 and segments 64 are further formed on the outer peripheral edge portion of the metal base 61. Convex regions 66 and 67 are formed on concentric circles around an axial hole 65. The convex region 67 is provided with through holes 68. Annular contact regions 70 are formed between convex regions 66 and 67.

The convex regions 66 and 67 are formed in hatched regions appearing in FIG. 19. The contact regions 70 are formed in regions between the convex regions 66 and 67. It is possible to make a Coulomb damping effect remarkable by clearly forming such annular contact regions 70 between the convex regions 66 and 67. As shown in FIG. 18, the metal base 61 is formed by three discs. Clearances 75 are defined in the convex regions 66 and 67. The through holes 68 are provided to pass through the clearances 75 of the convex region 67. Small clearances 69 are defined also in this embodiment.

In this embodiment, the convex regions 66 and 67 provided on the concentric circles shown in FIG. 17 may be formed to have a meandering configuration as desired or needed, to further increase the areas of the contact regions 70. Further, the stellate or windmill-shaped convex region shown in FIG. 1 or 9 or a modification thereof may be provided on the central disc. Alternatively, a plurality of discontinuous convex regions may be provided on the metal base 61.

Figure 9:
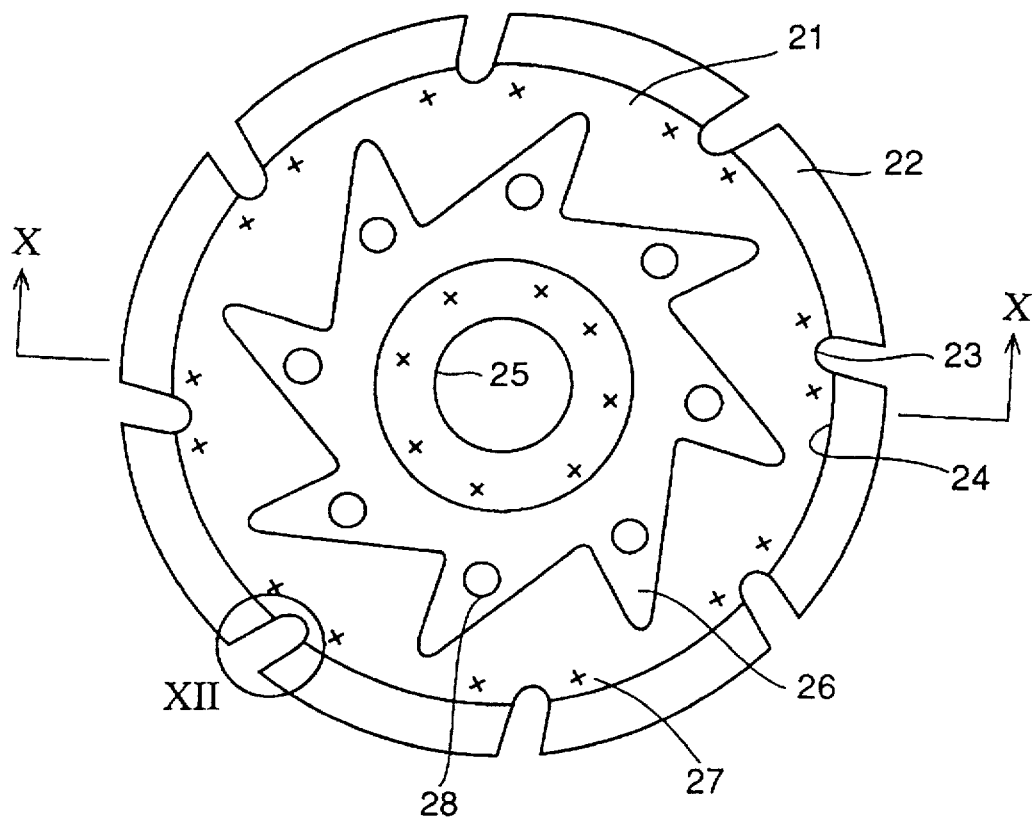
FIG. 9 is a front elevational view showing a blade according to another embodiment of the present invention.
Figure 10:
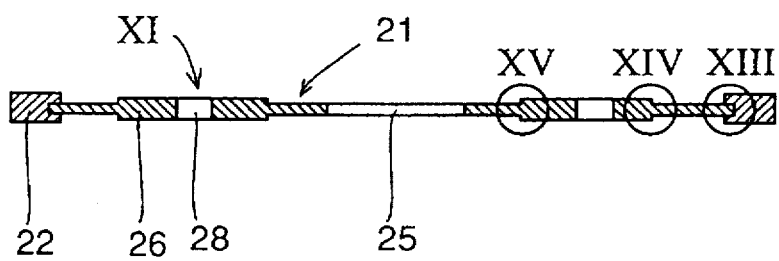
FIG. 10 is a schematic sectional view taken along the line X—X in FIG. 9.
Figure 11:
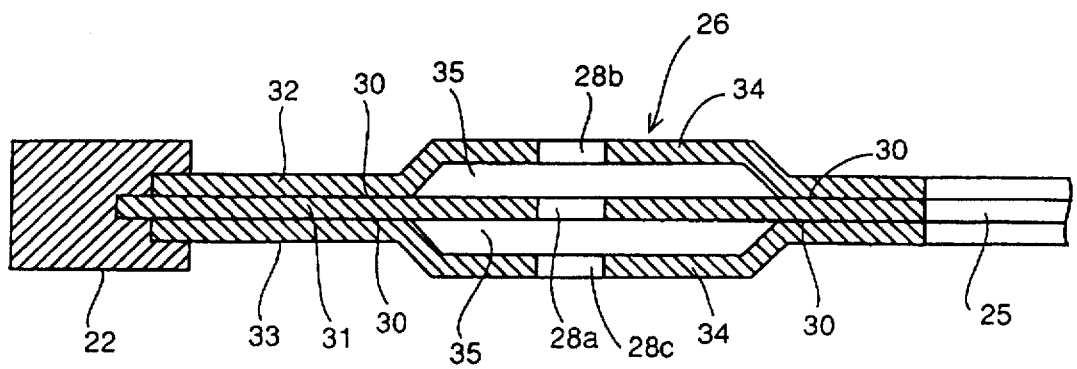
FIG. 11 is a sectional view illustrating a portion XI shown in FIG. 10 in detail.
Figure 12:
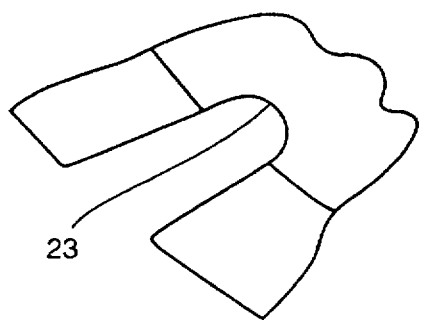
FIG. 12 is an enlarged view illustrating a portion XII shown in FIG. 9.

Table 2 shows noise values which were caused when concrete blocks forming the boundary between a pavement and a roadway were cut by 30 cm with the blades according to Examples of the embodiments shown in FIGS. 9 and 17 and comparative and conventional examples. These noise values were measured at a position separated by 1 m from the working position. It was also possible to attain desired Coulomb damping effects through the blades according to the embodiments shown in FIGS. 9 and 17, to reduce the noise values as compared with the prior art.

TABLE 2

| Test Sample | Structure | Noise Value (dB) |
|---|---|---|
| Example 4 | FIG. 9 | 89 |
| Example 5 | FIG. 17 | 87 |
| Example 6 | provided with no through holes in FIG. 9 | 92 |
| Conventional Example 3 | with single-layer metal base | 102 |
| Conventional Example 4 | with no convex portion and no inclination of notches in FIG. 9 | 92 |

In the embodiments shown in FIGS. 9 and 17, formation of the contact regions can be expected not only on the portions between the convex regions 66 and 67 provided on the concentric circles and the outer peripheral portion of the windmill-shaped convex region 26 but on the spot-welded positions. However, the contact regions can be uniformly controlled and formed in the regions of the metal base according to the present invention, whereby a blade having a prescribed damping effect can be manufactured with no dispersion or variation between products.

While FIG. 17 shows no spot-welded portions, prescribed regions are properly spot-welded. While the metal base is formed by three discs in each of the embodiments shown in FIGS. 9 and 17, the metal base may be formed by at least two discs, which may be prepared from different materials in different thicknesses. While the shapes, positions or numbers of the convex portions, notches, spot-welded portions or through holes illustrated in the figures are most preferable, the same may be properly changed in response to the workpiece to be cut and the diameter of the blade.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A blade comprising a discoidal substrate having a major surface and an outer peripheral edge portion bounding said major surface, and an abrasive grain layer arranged on said outer peripheral edge portion of said substrate, said substrate including:

a first disc having a first major surface, and a second disc having a second major surface being superposed on said first major surface of said first disc, said first and second discs being spot-connected with each other in a plurality of locations on said first and second major surfaces, said first major surface and said second major surface being separated from one another thereby forming at least one convex surface region on said major surface of said substrate, wherein said convex surface region has an annular shape surrounding a center of said discoidal substrate, a clearance being defined between said separated first and second major surfaces of said first and second discs in said convex surface region, a peripheral portion of said convex surface region comprising a contact portion where said first and second major surfaces of said first and second discs are slidably in contact with each other, wherein said peripheral portion of said convex surface region includes a circular inner peripheral edge, and an outer peripheral edge having a plurality of projections respectively extending radially from the center of said discoidal substrate and being spaced apart from one another in a circumferential direction.

2. The blade in accordance with claim 1, wherein said first and second discs have through holes reaching into said clearance.

3. The blade in accordance with claim 1, wherein said outer peripheral edge portion of said substrate has notched grooves therein at prescribed spaces from one another in the circumferential direction, and said abrasive grain layer is arranged on parts of said outer peripheral edge portion located between said notched grooves.

4. The blade in accordance with claim 3, wherein each of said notched grooves extends in a direction inclined with respect to a radial direction of said substrate.

5. A blade comprising a discoidal substrate having a major surface and an outer peripheral edge portion bounding said major surface, and an abrasive grain layer arranged on said outer peripheral edge portion of said substrate, said substrate including:

a first disc having a first major surface, and a second disc having a second major surface being superposed on said first major surface of said first disc, said first and second discs being spot-connected with each other in a plurality of locations on said first and second major surfaces, said first major surface and said second major surface being separated from one another thereby forming at least one convex surface region on said major surface of said substrate, wherein said convex surface region has an annular shape surrounding a center of said discoidal substrate, a clearance being defined between said separated first and second major surfaces of said first and second discs in said convex surface region, a peripheral portion of said convex surface region comprising a contact portion where said first and second major surfaces of said first and second discs are slidably in contact with each other, wherein said peripheral portion of said convex surface region includes a circular inner peripheral edge, and an outer peripheral edge having a plurality of projections respectively extending in directions inclined from radii extending from said center opposite to an intended direction of rotation of said substrate.

6. A blade comprising a discoidal substrate having a major surface and an outer peripheral edge portion bounding said major surface, and an abrasive grain layer arranged on said outer peripheral edge portion of said substrate, said substrate including:

a first disc having a first major surface, a third disc having a third major surface, and a second disc having two second major surfaces, arranged between said first and third discs with said first and third major surfaces respectively superposed on said second major surfaces, said first, second and third discs being spot-connected with each other in a plurality of locations on said first, second and third major surfaces, at least one of said first major surface and said third major surface being separated from a respective superposed one of said second major surfaces of said second disc thereby forming at least one convex surface region on said major surface of said substrate, wherein said convex surface region has an annular shape surrounding a center of said discoidal substrate, a clearance being defined in said convex surface region between said respective superposed second major surface and said at least one of said first and third major surfaces that is separated from said respective superposed second major surface, a peripheral portion of said convex surface region comprising a contact portion where said at least one of said first and third major surfaces, and said respective superposed second major surface are slidably in contact with each other, wherein said peripheral portion of said convex surface region includes a circular inner peripheral edge, and an outer peripheral edge having a plurality of projections respectively extending radially from the center of said discoidal substrate and being spaced apart from one another in a circumferential direction.

7. The blade in accordance with claim 6, wherein said first, second and third discs have through holes passing through said clearance.

8. The blade in accordance with claim 6, wherein said outer peripheral edge portion of said substrate has notched grooves therein at prescribed spaces from one another in the circumferential direction, and said abrasive grain layer is arranged on parts of said outer peripheral edge portion located between said notched grooves.

9. The blade in accordance with claim 8, wherein each of said notched grooves extends in a direction inclined with respect to a radial direction of said substrate.

10. A blade comprising a discoidal substrate having a major surface and an outer peripheral edge portion bounding said major surface, and an abrasive grain layer arranged on said outer peripheral edge portion of said substrate, said substrate including:

a first disc having a first major surface, a third disc having a third major surface, and a second disc having two second major surfaces, arranged between said first and third discs with said first and third major surfaces respectively superposed on said second major surfaces, said first, second and third discs being spot-connected with each other in a plurality of locations on said first, second and third major surfaces, at least one of said first major surface and said third major surface being separated from a respective superposed one of said second major surfaces of said second disc thereby forming at least one convex surface region on said major surface of said substrate, wherein said convex surface region has an annular shape surrounding a center of said discoidal substrate, a clearance being defined in said convex surface region between said respective superposed second major surface and said at least one of said first and third major surfaces that is separated from said respective superposed second major surface, a peripheral portion of said convex surface region comprising a contact portion where said at least one of said first and third major surfaces, and said respective superposed second major surface are slidably in contact with each other, wherein said peripheral portion of said convex surface region includes a circular inner peripheral edge, and an outer peripheral edge having a plurality of projections respectively extending in directions inclined from radii extending from said center opposite to an intended direction of rotation of said substrate.

11. The blade in accordance with claim 10, wherein said first, second and third discs have through holes passing through said clearance.

12. The blade in accordance with claim 10, wherein said outer peripheral edge portion of said substrate has notched grooves therein at prescribed spaces from one another in the circumferential direction, and said abrasive grain layer is arranged on parts of said outer peripheral edge portion located between said notched grooves.

13. The blade in accordance with claim 12, wherein each of said notched grooves extends in a direction inclined with respect to a radial direction of said substrate.

14. The blade in accordance with claim 5, wherein said first and second discs have through holes reaching into said clearance.

15. The blade in accordance with claim 5, wherein said outer peripheral edge portion of said substrate has notched grooves therein at prescribed spaces from one another in the circumferential direction, and said abrasive grain layer is arranged on parts of said outer peripheral edge portion located between said notched grooves.

16. The blade in accordance with claim 15, wherein each of said notched grooves extends in a direction inclined with respect to a radial direction of said substrate.

* * * * *

UNITED STATES PATENT AND TRADEMARK OFFICE
CERTIFICATE OF CORRECTION

PATENT NO. : 5,697,359

DATED : Dec. 16, 1997

INVENTOR(S) : Okanishi et al.

It is certified that error appears in the above-identified patent and that said Letters Patent is hereby corrected as shown below:

On the Title Page:

In [56] References Cited:
  line 4, replace "Ekloff et al." by --Eklöf et al.--.

Col. 7, line 24, replace "angles 8" by --angles θ--.

Signed and Sealed this

Twenty-fourth Day of March, 1998

*Attest:*

BRUCE LEHMAN

*Attesting Officer*     *Commissioner of Patents and Trademarks*